United States Patent

[11] 3,631,742

| [72] | Inventor | Erich Hoffmeister<br>Biberach (Riss), Germany |
|---|---|---|
| [21] | Appl. No. | 24,227 |
| [22] | Filed | Mar. 31, 1970 |
| [45] | Patented | Jan. 4, 1972 |
| [73] | Assignee | Kaltenbach & Voigt<br>Biberach (Riss), Germany |
| [32] | Priority | Apr. 1, 1969 |
| [33] | | Germany |
| [31] | | G 69 13 202 |

[54] DENTAL DRIVE
7 Claims, 2 Drawing Figs.

| [52] | U.S. Cl. | 74/798 |
|---|---|---|
| [51] | Int. Cl. | F16h 13/06 |
| [50] | Field of Search | 74/798 |

[56] References Cited
UNITED STATES PATENTS

| 1,201,367 | 10/1916 | Shelton | 74/798 |
|---|---|---|---|
| 1,298,560 | 3/1919 | Poppink | 74/798 X |
| 1,986,177 | 1/1935 | Zastoupil | 74/798 |
| 3,457,683 | 7/1969 | Steiner | 32/26 X |

Primary Examiner—Arthur T. McKeon
Attorney—Michael S. Striker

ABSTRACT: A dental drive comprising a housing in or on which a prime mover is carried which has a rotatable output shaft. A drive shaft is journaled for rotation in the housing and provided with connecting means for connecting a dental tool therewith so that the tool is rotated by the drive shaft. A first epicyclic ball gear is mounted in motion-transmitting relationship with the output shaft to receive motion from the same, and at least one second epicyclic ball gear is mounted in motion-transmitting relationship with the first gear and with the drive shaft for receiving from the first gear motion which it transmits to the drive shaft.

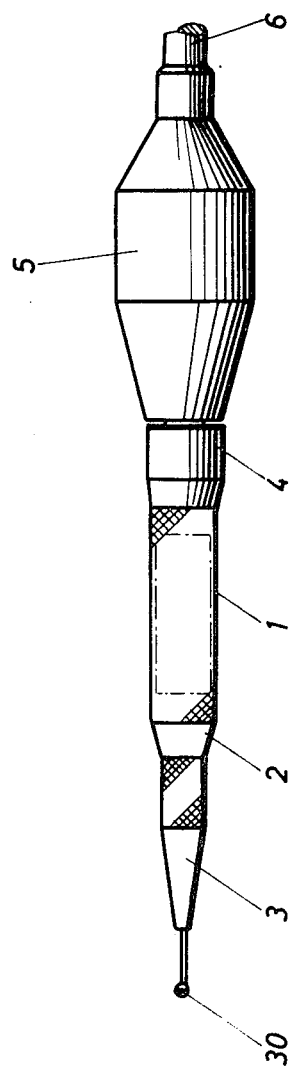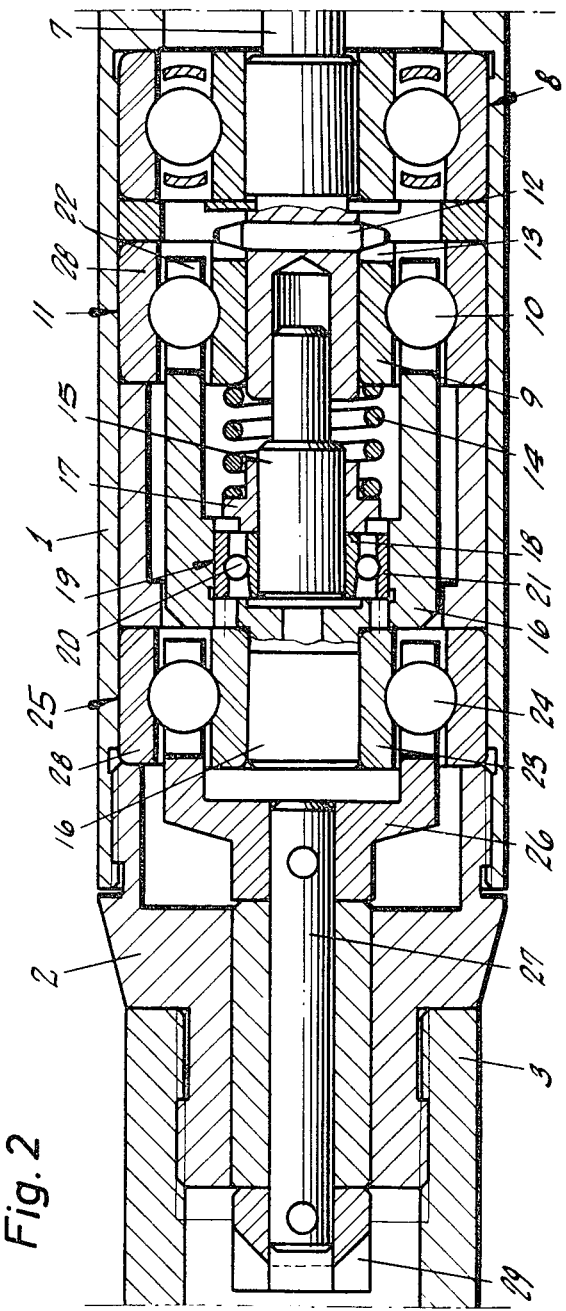

DENTAL DRIVE

BACKGROUND OF THE INVENTION

The present invention relates generally to dental apparatus, and more particularly to dental drives. Still more particularly, the present invention relates to a straight or angled dental handpiece with a built-in or attached fractional horsepower motor.

Many of the tools used in dental work require rotation, such as drills, buffers, or the like. It is, therefore, of course known to provide various types of power units which provide such rotation to the tools which can be connected to them. In particular, dental drives or handpieces, some of them with articulated joint connections, are known which either comprise a simple reduction gear constructed as a ball epicyclic gear or a simple step-up gear which is likewise constructed as an epicyclic ball gear. However, for many detail applications a simple speed reduction or a simple speed step-up is inadequate. This is true particularly in the case of straight or angled dental handpieces provided with electric or air motors of between 2,000 and 4,000 r.p.m. which are used for treatment of root canals in living teeth, and also in the case of motors operating in the range of substantially 10,000 to 20,000 r.p.m. for grinding work which must be carried out rapidly at relatively high rotational speeds on a living tooth.

SUMMARY OF THE INVENTION

It is, accordingly, an object of the present invention to provide an improved dental drive of the type under discussion.

More particularly, it is an object of the present invention to provide such a dental drive whether of the straight or angled handpiece type, which provides for a larger reduction or a larger step-up ratio than was possible heretofore.

A concomitant object of the invention is to provide such a novel dental drive which affords the aforementioned advantages without any significant increase in size.

In pursuance of the above objects, and others which will become apparent hereinafter, one feature of the invention resides in a dental drive which comprises housing means and a prime mover carried by the housing means and having a rotatable output shaft. A drive shaft is journaled for rotation in the housing means and connecting means is provided for connecting a dental tool with the drive shaft for rotation by the same. A first epicyclic ball gear is arranged in motion-transmitting relationship with the output shaft for receiving motion therefrom, and at least one second epicyclic ball gear is arranged in motion-transmitting relationship with the first gear and with the drive shaft for receiving motion from the former and for transmitting such motion to the latter.

With identical drives according to the present invention it is possible to achieve a step-up or reduction ratio which is double that heretofore known in the art, and more particularly this is achieved by accommodating the epicyclic ball gears utilized according to the present invention quite readily in the relatively small-diameter tubular casing of the dental drive, so that an increase in the dimension of the casing or housing can be avoided.

Advantageously, a sleeve is mounted for rotation and for displacement axially of itself within the housing and extends from one to the other of the shafts, namely from the output shaft of the motor to the drive shaft which is to be coupled with the dental tool. The first epicyclic ball gear comprises an inner race which is mounted on the output shaft for rotation therewith and which has freedom of limited axial displacement relative thereto. An outer race surrounds the inner race and is fixed with the housing means, with balls being accommodated between the races. The second gear in turn comprises an interior race surrounding and fixed with the sleeve remote from the output shaft and from the inner race of the first gear, an exterior race which surrounds the interior race and is fixed with the housing means, and balls which are accommodated between the exterior and interior races. Biasing means is interposed between and bears against the sleeve and the inner race and engaging means is provided on the sleeve and the drive shaft and is in motion-receiving engagement with the first and second gears, respectively. This construction is particularly advantageous from a point of view of accommodating the various components within the relatively small-diameter tubular housing. It will be appreciated that if for instance an additional second epicyclic ball gear is to be used, it would correspond to the first-mentioned second gear and would be mounted on an additional sleeve also rotatable and interposed between the first-mentioned sleeve and the drive shaft, to receive motion from the first-mentioned sleeve to be transmitted to the drive shaft. However, this construction is particularly suitable for a stepdown drive, although it can be also used as a step-up drive if the input and output are reversed, that is if the drive shaft becomes the output of the motor, and in place of the above-identified output shaft a drive shaft for connection with the tools is used.

According to the invention it is further advantageous if the free end of the output shaft of the motor is supported with reference to the sleeve by means of a bearing which accepts both axial and radial loads. The inner race of the first gear can be readily fixed with the output shaft for rotation therewith but with freedom of limited axial displacement relative thereto by having a pin extend transversely to the output shaft with opposite end sections of the pin projecting beyond the circumference of the output shaft, and by providing an inner cylindrical surface of the inner race with axially extending recesses or grooves so that the inner race can be slipped over the output shaft until the projecting end sections of the pin are received in the respective grooves, thus preventing relative rotation of the inner race and the output shaft but permitting axial displacement of the former with reference to the latter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a side-elevational view of a dental drive according to the present invention; and FIG. 2 is a vertical longitudinal section through a portion of the dental drive of FIG. 1, on an enlarged scale and showing details germane to the invention.

DESCRIPTION OF THE PREFERRED EMBODIMENT

Discussing now the drawing in detail it will be seen that reference numeral 1 identifies the actual housing of the novel dental drive, whereas reference numeral 2 is a conically tapering end portion for the housing 1. A tip 3 projects from the end portion 2 and a dental tool to be rotated, for instance a drill or the like, is identified with reference numeral 30 and extends into the tip 3 where it is connected in motion-transmitting relationship with the drive shaft of the drive.

Reference numeral 4 identifies an enlarged housing section for which there is connected in suitable known manner a miniaturized motor 5, which may be an electromotor, an air motor, a turbine or the like. Reference numeral 6 identifies a conductor for supplying motive energy to the motor 5.

Motor 5 has an output shaft 7 which, as shown in FIG. 2 is journaled for rotation in the housing 1 by means of antifriction bearings. It should be pointed out in this context that the fragmentary sectionally illustrated portion of the drive shown in FIG. 2 is identified in FIG. 1 in broken lines, in order to establish where the components illustrated in FIG. 2 are located in the overall drive. Turning to FIG. 2 it is pointed out that one of the bearings journaling the output shaft 7 is identified with reference numeral 8. To the left (in FIG. 2) of the bearing 8 there is mounted on the output shaft 7 an inner race 9 for the balls 10 of a first epicyclic or planetary ball gear 11; this inner race 9 is so connected with the output shaft 7 that it rotates with the same but has limited freedom of axial displacement relative to the shaft 7. For this purpose a transverse pin 12 penetrates the output shaft 7 and projects with its opposite axial end sections beyond the circumference thereof, so that the end sections extend into corresponding grooves 13 provided in the inner circumferential surface of the inner race 9, which grooves 13 extend axially in the inner race 9 so that limited freedom of sliding movement of the inner race 9 with reference to the axial elongation of the output shaft 7 is provided, whereas relative rotation of the output shaft 7 and the inner race 9 is prevented.

Reference numeral 14 in FIG. 2 identifies a helically convoluted expansion spring which surrounds a projection 15 and abuts with one end against the inner ring or race 9, urging the same towards the right-hand side in FIG. 2. The opposite end of the spring 14 bears against an axially shiftable intermediate sleeve 17 one end of which surrounds the projection 15. Pressure transmission occurs via the shoulder 17 of the projection 15 and from there to the inner ring 18 of an axial and radial thrust bearing 19, which inner ring 18 is fast with the projection 15. This, the balls 20 of the antifriction ball bearing 19 are located between the inner ring 18 and the associated outer ring 21 which surrounds the inner ring 18 and is fast with the sleeve 16. This construction thus serves to support the output shaft 7 with reference to the sleeve 16. The latter has one end 22 provided with a plurality of axially extending circumferentially spaced projections each of which extends between two circumferentially consecutive balls 10 of the first gear 11, so that in response to rotation of the output shaft 7 and consequent rolling movement of the balls 10 between the races of the first gear the sleeve 16 is rotated at a stepdown ratio.

As the drawing shows, particularly FIG. 2, a second planetary or epicyclic ball gear 25 is provided. This utilizes an inner race 23 fast with that end of the sleeve 16 which is remote from the end 22, and additional balls 24 are accommodated between the ring 23 and the outer ring 28 of the second gear 25 (the outer ring of the first gear 11 is also identified with reference numeral 28). The drive shaft 27 which is to be coupled with a tool, such as the tool 30 shown in FIG. 1, has an end portion 26 adjacent the gear 25 and configurated essentially in he same manner as the end portion 22 of the sleeve 16, namely provided with a plurality of axially extending projections which are circumferentially spaced and each of which extends between two circumferentially adjacent balls 24 of the second gear 25. Thus, when the sleeve 16 is rotated in response to rotation of the output shaft 7, the balls 24 move with reference to their races and the drive shaft 27 is rotated thereby, with the rotation of the shaft 27 being further stepped-down with reference to the rotation of the sleeve 16 which is already stepped-down with respect to the rotation of the output shaft 7.

In the illustrated embodiment the stepdown ratio between the output shaft 7 and the drive shaft 27 is approximately 7.4:1. Of course, it will be appreciated that the relationship can be reversed and that the output shaft 7 could be utilized as the drive shaft whereas the current drive shaft 27 could be the output shaft of the motor 5. In this case the illustrated construction would be a step-up arrangement and the step-up ratio would be 1:7.4.

A member 29 is provided at that end of the shaft 27 which is remote from the second gear 25 (see FIG. 2) and this engages with a matingly configurated member of a further shaft mounted in the tip 3 and not illustrated. The tool, that is the drill, grinding tool or the like which is identified with reference numeral 30 in FIG. 1, is coupled in suitable manner with this further shaft in the tip 3. It will be appreciated, however, that for purposes of the present invention the shaft 27 might as well be of one piece with this further shaft in the tip 3, or it could be omitted and the shaft in the tip 3 would be correspondingly longer to engage the gear 25. Either of them, or both of them together are to be considered the drive shaft to which the tool 30 is to be coupled for rotation.

The spring 14 displaces the inner race or ring 9 with the right-hand side in FIG. 2, and at the same time it displaces the sleeve 16 and the inner race 23 which is fast therewith with the left-hand side. This results in stress-transmitting relationship of the balls 10 and 24 in the gears 11 and 25 in such a manner that when the output shaft 7 rotates, and correspondingly the sleeve 16 is rotated, the balls 10 and 24 are forced to move in respectively circular paths, rolling on their inner races 9 and 23 respectively, and on the stationarily mounted outer races 28 associated with these respective inner races. The outer races 28, incidentally, as fast with the housing as illustrated. The projections in response to movement of the balls 10 and 24, respectively, the projections on the end 22 of the sleeve 16 and the end 26 of the drive shaft 7, each of which projects between two circumferentially consecutive balls 10 and 24, respectively, are caused to move along with the respective balls, so that the sleeve 16 and the shaft 27 respectively are rotated.

It goes without saying, and is mentioned here only for the sake of completeness, that the construction illustrated by way of example in FIGS. 1 and 2 can be modified in various ways without departing in any way from the scope and intent of the present invention. For instance, the drive shown in FIG. 1 could be readily constructed as an angle drive, merely by having the motor 5 located in such a manner that its axis of rotation extends for instance at a 90° angle with reference to the axis of rotation of the shaft 7. There would, of course, have to be an angle transmission between the shaft of the motor and the shaft 7. The construction and location of the components illustrated in FIG. 2 is not thereby affected, as is clear from a consideration of the broken line outline which indicates in FIG. 1 which components of FIG. 2 are located with reference to the overall dimensions of the drive of FIG. 1.

It will be understood that each of the elements described above, or two or more together, may also find a useful application in other types of applications differing from the types described above.

While the invention has been illustrated and described as embodied in a dental drive, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A dental drive comprising, in combination, housing means; a prime mover carried by said housing means and having a rotatable output shaft; a drive shaft journaled for rotation in said housing means; connecting means for connecting a dental tool with said drive shaft for rotation by the same; a first epicyclic ball gear in motion-transmitting relationship with said output shaft for receiving motion therefrom; at least one second epicyclic ball gear in motion-transmitting relationship with said first gear and said drive shaft for receiving motion from the former and transmitting such motion to the latter; a sleeve mounted for rotation and for displacement axially of itself and extending from one to the other of said shafts; said first gear comprising an inner race mounted on said output shaft for rotation therewith and limited axial displacement relative thereto, an outer race surrounding said inner race and fixed with said housing means, and balls accommodated between said races; said second gear comprising an interior race surrounding and fixed with said sleeve remote from said output shaft and inner race, an exterior race surrounding said interior race and fixed with said housing means, and balls accommodated between said races; biasing means interposed between and bearing against said sleeve and said inner race; engaging means provided on said sleeve and said drive shaft and being in motion-receiving engagement with said first and second gears, respectively; and cooperating arresting portions on said output shaft and inner race for preventing relative rotation of the former and the latter.

2. A dental drive as defined in claim 1, said balls of said first and second gears, respectively, being spaced circumferentially of the respective race; and wherein said engaging means on said sleeve and drive shaft each comprise a plurality of axially projecting circumferentially spaced projections each of which extends into the space between two circumferentially consecutive balls of said first and second gear, respectively.

3. A dental drive as defined in claim 1, said sleeve having a first end portion surrounding a free end of said output shaft, and a second end portion remote from said free end and carrying said interior race.

4. A dental drive as defined in claim 3, further comprising antifriction bearing means engaging and supporting said free end of said output shaft with reference to said first end portion of said sleeve.

5. A dental drive as defined in claim 4, wherein said antifriction bearing means is constructed for absorbing axial as well as radial loads.

6. A dental drive as defined in claim 1, said engaging portions comprising a pin extending transversely through said output shaft and having end sections extending beyond the circumference of the same, and cooperating axially extending recesses in an inner cylindrical surface of said inner race for receiving said end sections.

7. A dental drive as defined in claim 1, said biasing means being a helical expansion spring.

* * * * *